United States Patent
Huang et al.

(10) Patent No.: US 8,009,235 B2
(45) Date of Patent: Aug. 30, 2011

(54) AUTO-DETECTION CIRCUIT AND CONTROL METHOD FOR VIDEO SIGNALS

(75) Inventors: Po-Feng Huang, Taipei Hsien (TW);
Hung-Hsi Chien, Taipei Hsien (TW);
Hsin-Yuan Hsieh, Taipei Hsien (TW);
Cheng-Tai Yang, Taipei Hsien (TW);
Wei-Chen Chou, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 1239 days.

(21) Appl. No.: 11/672,948

(22) Filed: Feb. 8, 2007

(65) Prior Publication Data
US 2008/0136968 A1   Jun. 12, 2008

(30) Foreign Application Priority Data
Dec. 8, 2006  (TW) ................................ 95146166 A

(51) Int. Cl.
*H04N 5/268* (2006.01)
(52) U.S. Cl. .................. 348/706; 348/554; 348/558
(58) Field of Classification Search .......... 348/553–558, 348/705, 706, 525–535
See application file for complete search history.

(56) References Cited

U.S. PATENT DOCUMENTS

| 5,054,022 A | 10/1991 | van Steenbrugge | |
|---|---|---|---|
| 2006/0061686 A1* | 3/2006 | Harvey | 348/521 |
| 2006/0221254 A1* | 10/2006 | Chang | 348/706 |
| 2007/0002174 A1* | 1/2007 | Wei et al. | 348/525 |

FOREIGN PATENT DOCUMENTS

| CN | 1086365 A | 5/1994 |
|---|---|---|
| CN | 1132976 A | 10/1996 |
| JP | 5219409 | 8/1993 |

OTHER PUBLICATIONS

Pual Horowitz and Winfield Hill, the Art of Electronic second edition,1989, Cambridge University press p. 70, 78.*
Adel S. Sedra and Kenneth C. Smith,"Mircoelectronic Circuit Second edition", 1987, CBS College publishing p. 219.*

* cited by examiner

*Primary Examiner* — Michael Lee
(74) *Attorney, Agent, or Firm* — Winston Hsu; Scott Margo

(57) ABSTRACT

An auto-detection circuit for detecting video signals includes a reception end for receiving a video signal, a synchronization signal detector coupled to the reception end for generating a waveform according to voltage variation of the video signal, a peak value detector coupled to the synchronization signal detector for determining peak value of the wave form, a direct current voltage level switch coupled to the peak value detector for switching output voltage as first direct current voltage level or second direct current voltage level, and an output end coupled to the direct current voltage level switch for outputting the output voltage.

19 Claims, 6 Drawing Sheets

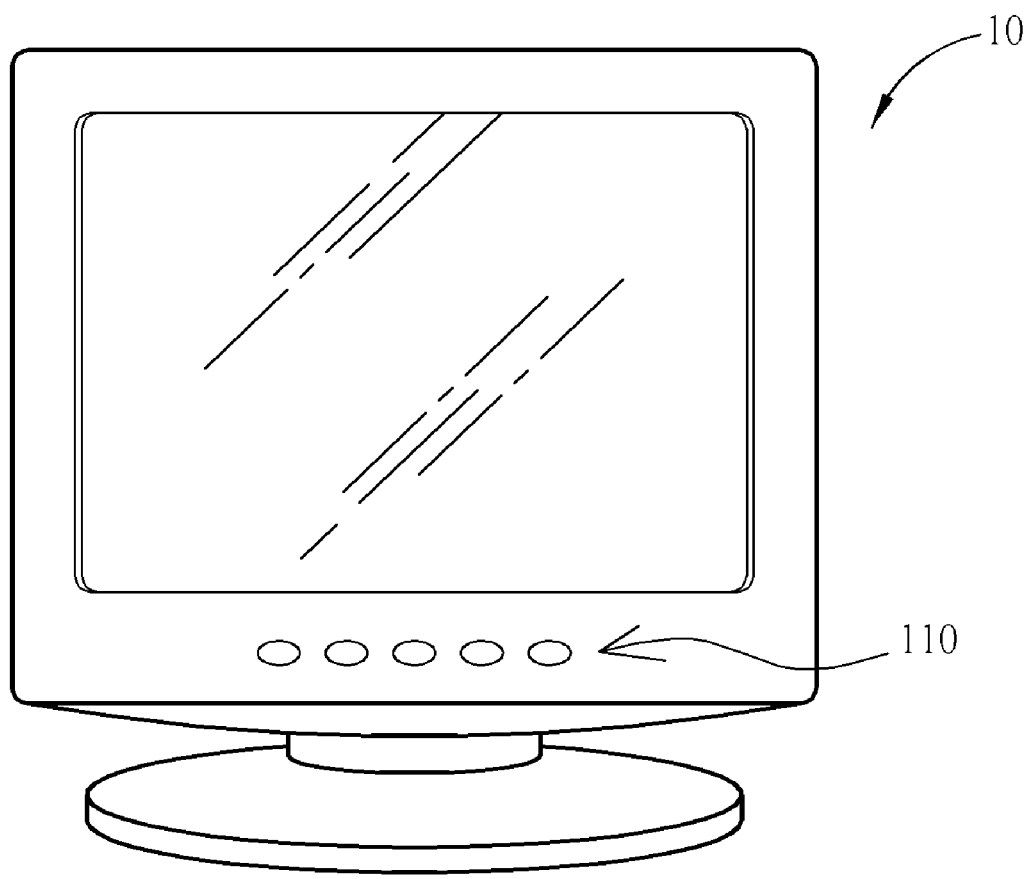
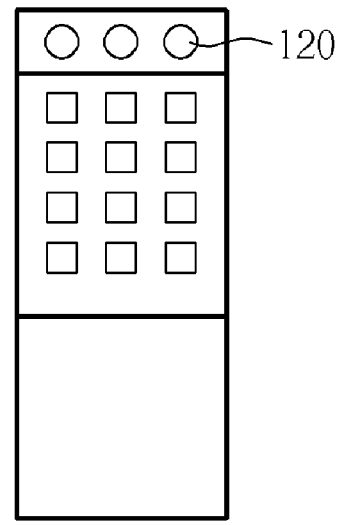
Fig. 1 Prior Art

AUTO-DETECTION CIRCUIT AND CONTROL METHOD FOR VIDEO SIGNALS

BACKGROUND OF THE INVENTION

1. Field of the Invention

The present invention relates to an auto-detection circuit and control method for video signals, and more particularly, to an auto-detection circuit and control method for auto-detecting video signals by utilizing a negative voltage characteristic of synchronization signals.

2. Description of the Prior Art

With the advancement of multimedia technology, there are more and more varieties of image and video output devices, such as DVD players, video game consoles, and TV boxes. Therefore, in order to display video signals outputted by the video output devices, many video signal input terminals are built into prior art display devices for receiving and displaying the video signals.

Please refer to FIG. 1. FIG. 1 is a schematic diagram of a prior art display device 10. The display device 10 is capable of receiving and displaying the video signals of the various video output devices. When users want to watch the video outputted by one of the various video output devices, the users can switch the video sources in sequence to obtain the video signal of the desired video output device by pressing a button 110 on the display device 10 or a button 120 on the remote control. In other words, when switching the video sources, the users have to press the button 110 of the display device 10 or the button 120 of the remote control to manually switch to the wanted video source. Thus, the operation of the prior art display device 10 is very inconvenient for the users.

Furthermore, when more video signal input terminals are set on the display device 10, the users have to spend much more time to switch to the correct video source. In this case, both the inconvenience and operation difficulty for the users are increased.

SUMMARY OF THE INVENTION

It is therefore a primary objective of the present invention to provide an auto-detection circuit and control method for video signals.

According to the present invention, an auto-detection circuit for detecting video signals by detecting a synchronization signal of the video signals comprises a reception end for receiving a video signal, a synchronization signal detector coupled to the reception end for generating a waveform according to a voltage variation of the video signal, a peak value detector coupled to the synchronization signal detector for determining a peak value of the waveform, a direct current voltage level switch coupled to the peak value detector for switching an output voltage to a first direct current voltage level or a second direct current voltage level, and an output end coupled to the direct current voltage level switch for outputting the output voltage.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a schematic diagram of a prior art display device.

DETAILED DESCRIPTION

Figure 2:
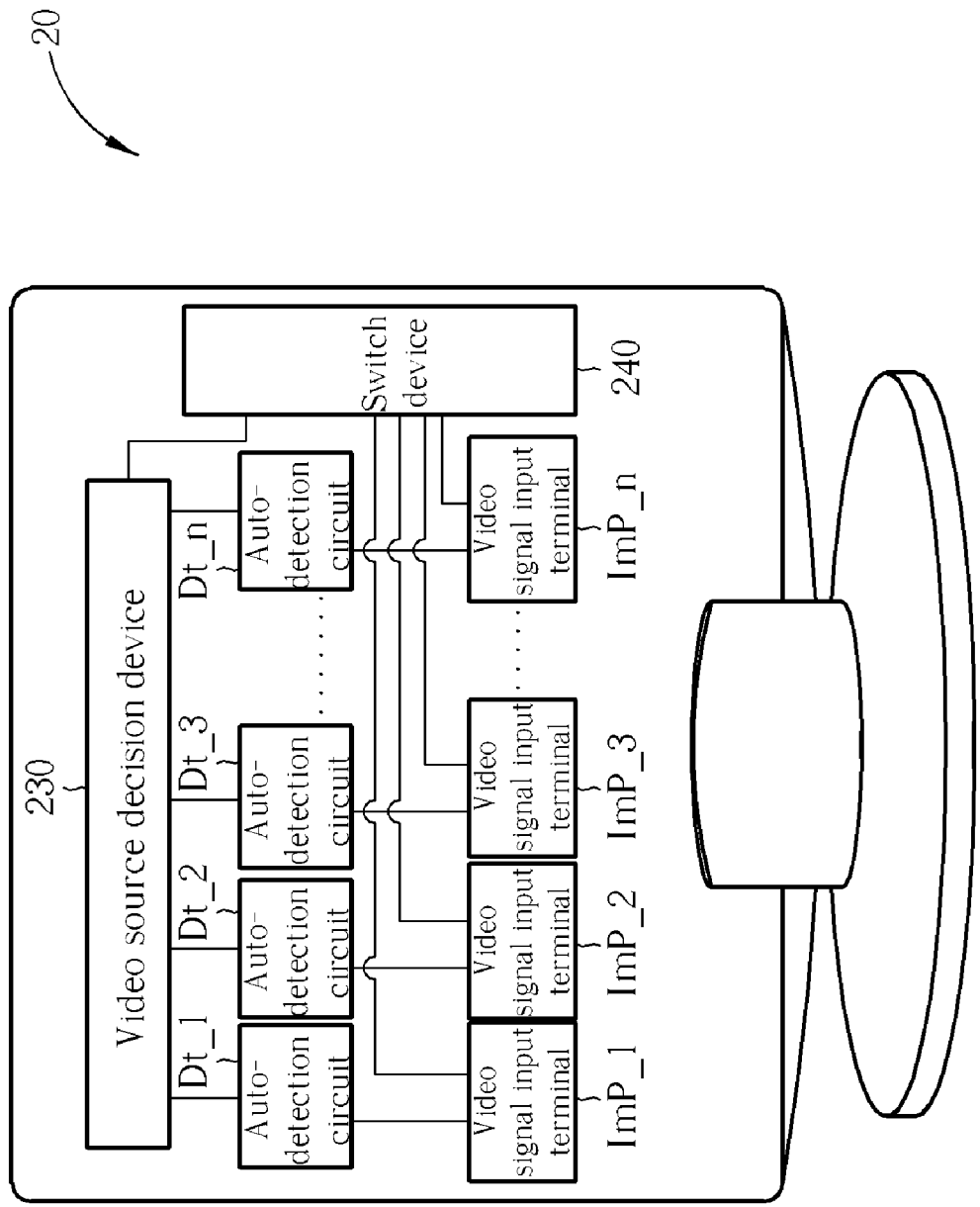
FIG. 2 is a schematic diagram of a display device capable of auto-detecting video sources according to an embodiment of the present invention.

Please refer to FIG. 2. FIG. 2 is a schematic diagram of a display device 20 capable of auto-detecting video sources according to a first embodiment of the present invention. The display device 20 includes video signal input terminals ImP_1~ImP_n, auto-detection circuits Dt_1~Dt_n, a video source decision device 230, and a switch device 240. The video signal input terminals ImP_1~ImP_n are usually set on the back of the display device 20, and are utilized for receiving video signals outputted from various video output devices. The auto-detection circuits Dt_1~Dt_n individually coupled to the video signal input terminals ImP_1~ImP_n are utilized for detecting the video signals by detecting a synchronization signal of the video signal, and outputting a corresponding first direct current voltage level or second direct current voltage level. According to the voltage level outputted from the auto-detection circuits Dt_1~Dt_n, the display device 20 can utilize the video source decision device 230 to determine the video source. After determining the video source with the video source decision device 230, the switch device 240 can switch the display device 20 to display the corresponding video signal.

Figure 4:
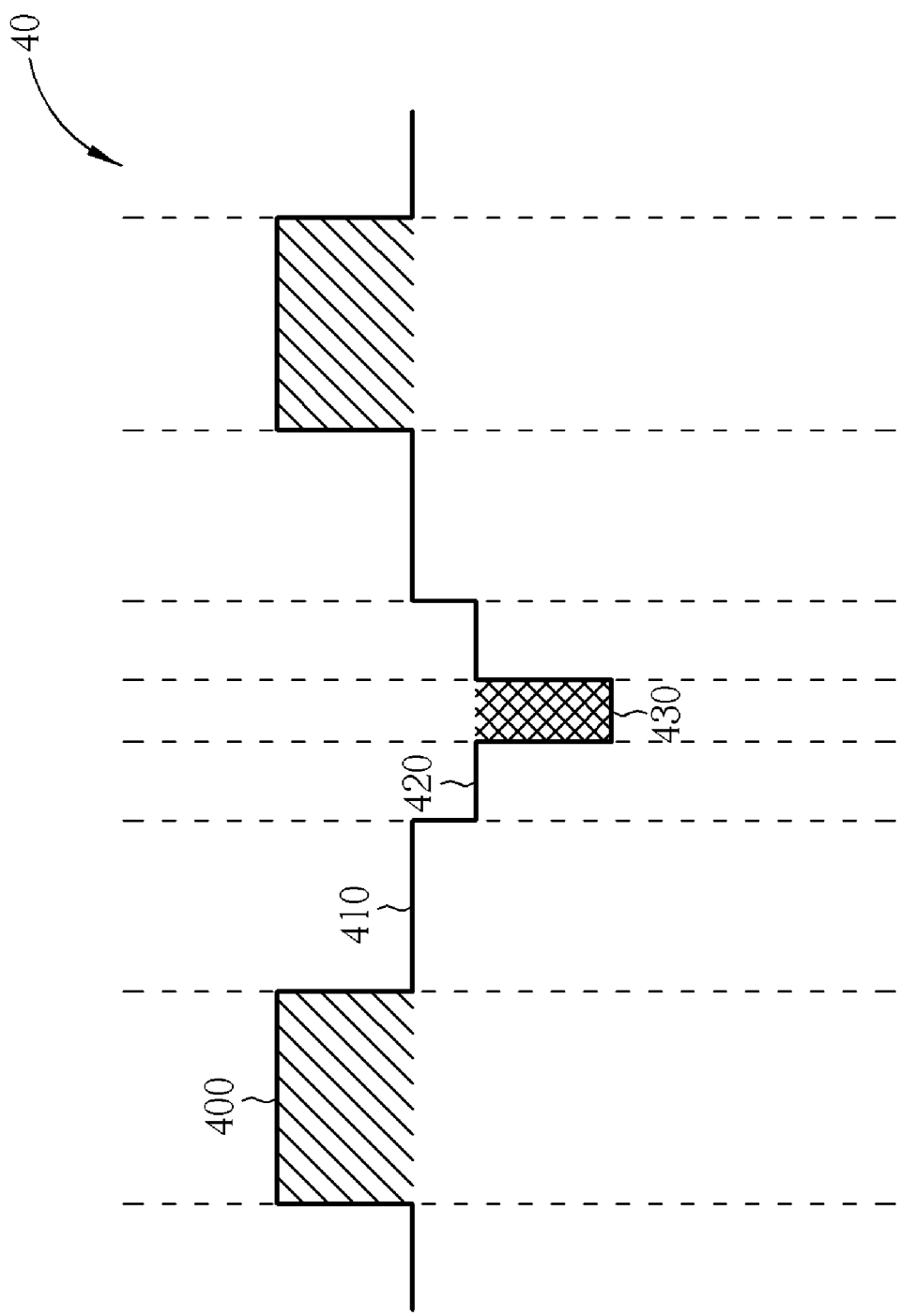
FIG. 4 is a schematic diagram of signal amplitude and timing sequence of a video signal.

In order to clearly illustrate the operation method of the display device 20 of the present invention, the voltage variation of a video signal has to be illustrated in the following in advance. Please refer to FIG. 4. FIG. 4 is a schematic diagram of signal amplitude and timing sequence of a video signal 40. The video signal can be roughly divided into four blocks 400, 410, 420, and 430. The block 400 indicates image data of the video signal 40, which can be the image data of a frame or a scanline depending on the time duration of the block 400, and the highest voltage of the block 400 is 0.7 V. The block 410 indicates a front porch period or a back porch period corresponding to a frame or a scanline, which is displayed as a black frame in the border of the display device. The block 420 indicates a blanking time period, or a flyback time period, and the voltage of the block 420 is about 0 V. The block 430 indicates a synchronization signal of the video signal, which can be a horizontal synchronization signal, a vertical synchronization signal, or a composite synchronization signal formed by superposing a horizontal synchronization signal and a vertical synchronization signal. Please note that the synchronization signal is indicated as a negative voltage in the video signal, and the voltage of the synchronization signal can be as low as −0.3 V. The present invention then utilizes the negative voltage characteristic of the synchronization signal to achieve the objective of detecting the video signals. Furthermore, the video signals mentioned in the present invention include image signals with synchronization signals.

Figure 5:
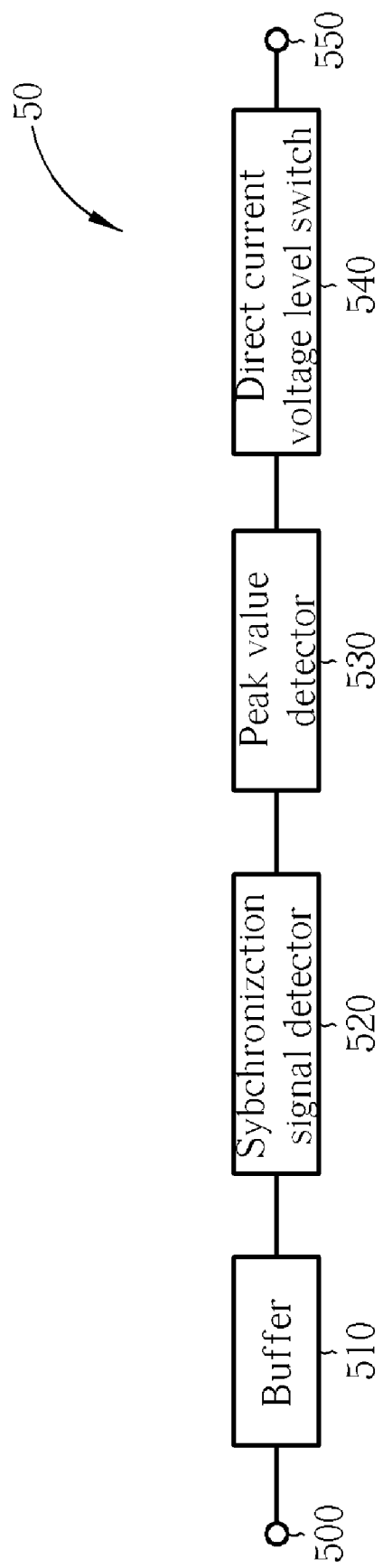
FIG. 5 is a schematic diagram of an auto-detection circuit for detecting video signals according to a preferred embodiment of the present invention.

Please refer to FIG. 5. FIG. 5 is a schematic diagram of an auto-detection circuit 50 for detecting video signals according to a preferred embodiment of the present invention. The auto-detection circuit 50 is utilized for realizing the auto-detection circuits Dt_1~Dt_n of FIG. 2, and includes a reception end 500, a buffer 510, a synchronization signal detector 520, a peak value detector 530, a direct current voltage level switch 540, and an output end 550. The reception end 500 is coupled to a video signal input terminal, and utilized for receiving a video signal inputted from the video signal input terminal. The buffer 510 is coupled between the reception end 500 and the synchronization signal detector 520, and is utilized for preventing the signals of a back-end circuit from interfering with the original video signal, and for raising the voltage level of the inputted video signal to an appropriate voltage level. The synchronization signal detector 520 is coupled to the buffer 510, and utilized for generating a corresponding waveform according to a voltage variation of the video signal. The peak value detector 530 is coupled to the synchronization signal detector 520, and utilized for determining a peak value of the waveform outputted from the synchronization signal detector 520. The direct current voltage level switch 540 is coupled to the peak value detector 530, and is utilized for switching an output voltage to a first direct current voltage level or a second direct current voltage level.

Figure 6:
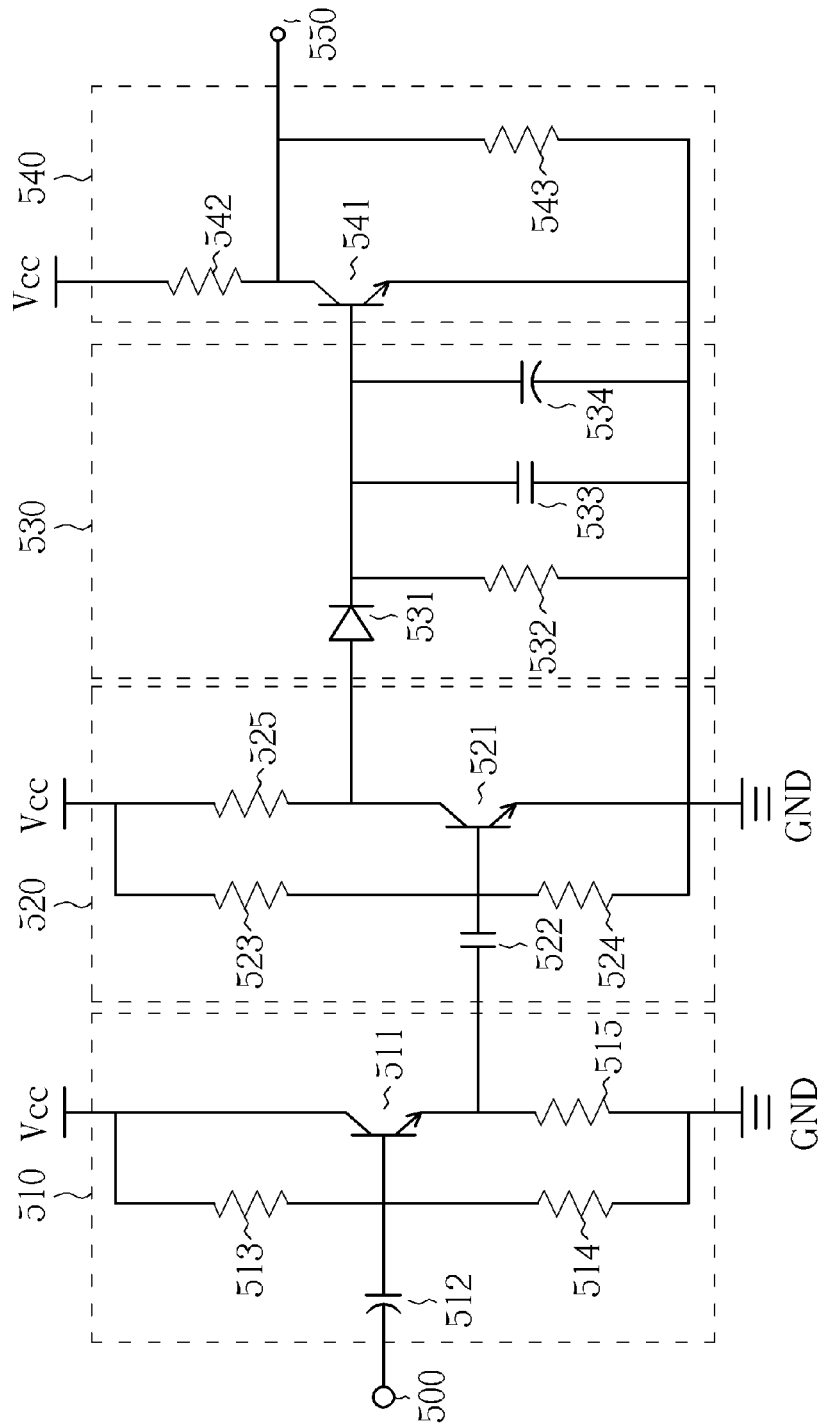
FIG. 6 is a schematic diagram of detailed operation and function of each section of the auto-detection circuit according to the preferred embodiment of the present invention.

As for the detailed operation and the function of each section of the auto-detection circuit 50, please proceed to refer to FIG. 6. The buffer 510 can be a common collector amplifier, which includes a bipolar transistor 511, a capacitor 512, a first resistor 513, a second resistor 514, and a third resistor 515. The collector of the bipolar transistor 511 is coupled to a voltage source Vcc, and the emitter is coupled to the synchronization signal detector 520. The capacitor 512 is coupled between the reception end 500 and the base of the bipolar transistor 511. One end of the first resistor 513 is coupled between the capacitor 512 and the base of the bipolar transistor 511, and the other end is coupled to a voltage source Vcc. One end of the second resistor 514 is coupled between the capacitor 512 and the base of the bipolar transistor 511, and the other end is coupled to a ground GND. One end of the third resistor 515 is coupled between the emitter of the bipolar transistor 511 and the synchronization signal detector 520, and the other end is coupled to the ground GND. After the video signal is received by the reception end 500, the capacitor 512 can filter out the direct current part of the video signal, and further prevent the signal of the auto-detection circuit from affecting the quality of the original video signals. Then, with the common collector amplifier composed by the resisters 513~515, and the bipolar transistor 511, the inputted signal can be raised to an appropriate voltage level.

Then, the signal outputted from the buffer 510 is inputted into the synchronization signal detector 520. The synchronization signal detector 520 is utilized for detecting the horizontal or vertical synchronization signal of the video signal. As shown in FIG. 6, the synchronization signal detector 520 can be a common emitter amplifier, which includes a bipolar transistor 521, a capacitor 522, a first resistor 523, a second resistor 524, and a third resistor 525. The collector of the bipolar transistor 521 is coupled to the peak value detector 530, and the emitter is coupled to the ground GND. The capacitor 522 is coupled between the buffer 510 and the base of the bipolar transistor 521. One end of the first resistor 523 is coupled between the capacitor 522 and the base of the bipolar transistor 521, and the other end is coupled to the voltage source Vcc. One end of the second resistor 524 is coupled between the capacitor 522 and the base of the bipolar transistor 521, and the other end is coupled to the ground GND. One end of the third resistor 525 is coupled between the collector of the bipolar transistor 521 and the peak value detector 530, and the other end is coupled to the voltage source Vcc. Through the capacitor 522, the signal outputted from the buffer 510 is converted into the video signal without the direct current bias. Then, by utilizing the common collector amplifier formed by the resistors 523~525 and the bipolar transistor 521, the synchronization signal of the video signal can be detected. The bias voltage divided by the resistors 523, 524 just equals the critical value of the base-emitter turn-on voltage of the bipolar transistor 521, and can just bias the bipolar transistor 521 to operate in a normally on condition. Therefore, the image data of the video signal with a positive voltage level can turn on the bipolar transistor 521, so that the voltage outputted from the emitter of the bipolar transistor 521 is close to the voltage of the ground GND. On the contrary, the synchronization signal with the negative voltage level turns off the bipolar transistor 521, so that the voltage outputted from the emitter of the bipolar transistor 521 is close to the voltage of the voltage source Vcc, and becomes a positive voltage level. With this method, the synchronization signal detector 520 can detect the synchronization signal of the video signal, and generate a corresponding waveform.

Owing that the waveform outputted from the synchronization signal detector 520 is like a digital square wave, the peak value detector 530 is utilized for determining the peak value of the waveform, and converting the signal into a direct current signal according to the peak value. As shown in FIG. 6, the peak value detector 530 includes a diode 531, a resistor 532, a first capacitor 533, and a second capacitor 534. The diode 531 is coupled between the synchronization signal detector 520 and the direct current voltage level switch 540, and is utilized as a switch. One end of the resistor 532 is coupled between the diode 531 and the direct current voltage level switch 540, and the other end is coupled to the ground GND. One end of the first capacitor 533 is coupled between the diode 531 and the direct current voltage level switch 540, and the other end is coupled to the ground GND. One end of the second capacitor 534 is coupled between the diode 531 and the direct current voltage level switch 540, and the other end is coupled to the ground GND. The peak value detector is a common rectifying circuit, which not only can convert the oscillating digital-like square wave outputted from the synchronization signal detector 520 into a direct current signal, but also can reduce the ripple caused by the oscillating square wave for eliminating the direct current voltage drift.

Due to the auto-detection circuit 50 of the embodiment taking the back-end circuits (such as microprocessors, or FPGAs) into account, the direct current voltage level switch 540 capable of protecting the back-end circuits has to be added after the peak value detector 530. As shown in FIG. 6, the direct current voltage level switch 540 includes a bipolar transistor 541, a first resister 542, and a second resister 543. By turning the bipolar transistor 541 on or off, the direct current voltage level switch 540 can convert the signals turning on the bipolar transistor 541 into an acceptable direct current voltage level with the voltage divider composed by the resistor 542 and 543, so that the back-end device can be prevented from being damaged by an inappropriate direct current voltage level. When the voltage level of the signal outputted from the peak value detector 530 is low (i.e. the auto-detection circuit 50 does not receive a synchronization signal), the bipolar transistor 541 is turned off and the direct current voltage level switch 540 outputs a high voltage level signal, wherein the voltage value is determined by the voltage divider formed by the resistor 542 and 543. On the contrary, when the voltage level of the signal outputted from the peak value detector 530 is high (i.e. the auto-detection circuit 50 receives a synchronization signal), the bipolar transistor 541 is turned on, and the direct current voltage level switch 540 outputs a low voltage level signal. Please note that the high direct current voltage level outputted from the peak value detector 530 has to be greater than or equal to the critical value of the base-emitter turn-on voltage of the bipolar transistor 541.

Therefore, when the video signal received by the auto-detection circuit 50 includes a synchronization signal with a negative voltage level, the bipolar transistor 521 of the synchronization signal detector 520 is switched from an on-state to an off-state, so that the voltage outputted from the emitter of the bipolar transistor 521 is changed from a low voltage level to a high voltage level. In this case, the signal outputted from the peak value detector 530 can turn on the bipolar transistor 541 of the direct current voltage level switch 540, and the voltage of the emitter of the bipolar transistor 541 is changed from high to low. In other words, when the auto-detection circuit 50 detects the synchronization signal of the video signal, the voltage level of the output end 550 is turned from high to low, and then the video signal source can be determined by the video source decision device 230. Please note that the auto-detection circuit mentioned in the present invention not only can be applied to the display devices, but can also be applied to various electronic devices for auto-detecting the video sources.

Figure 3:
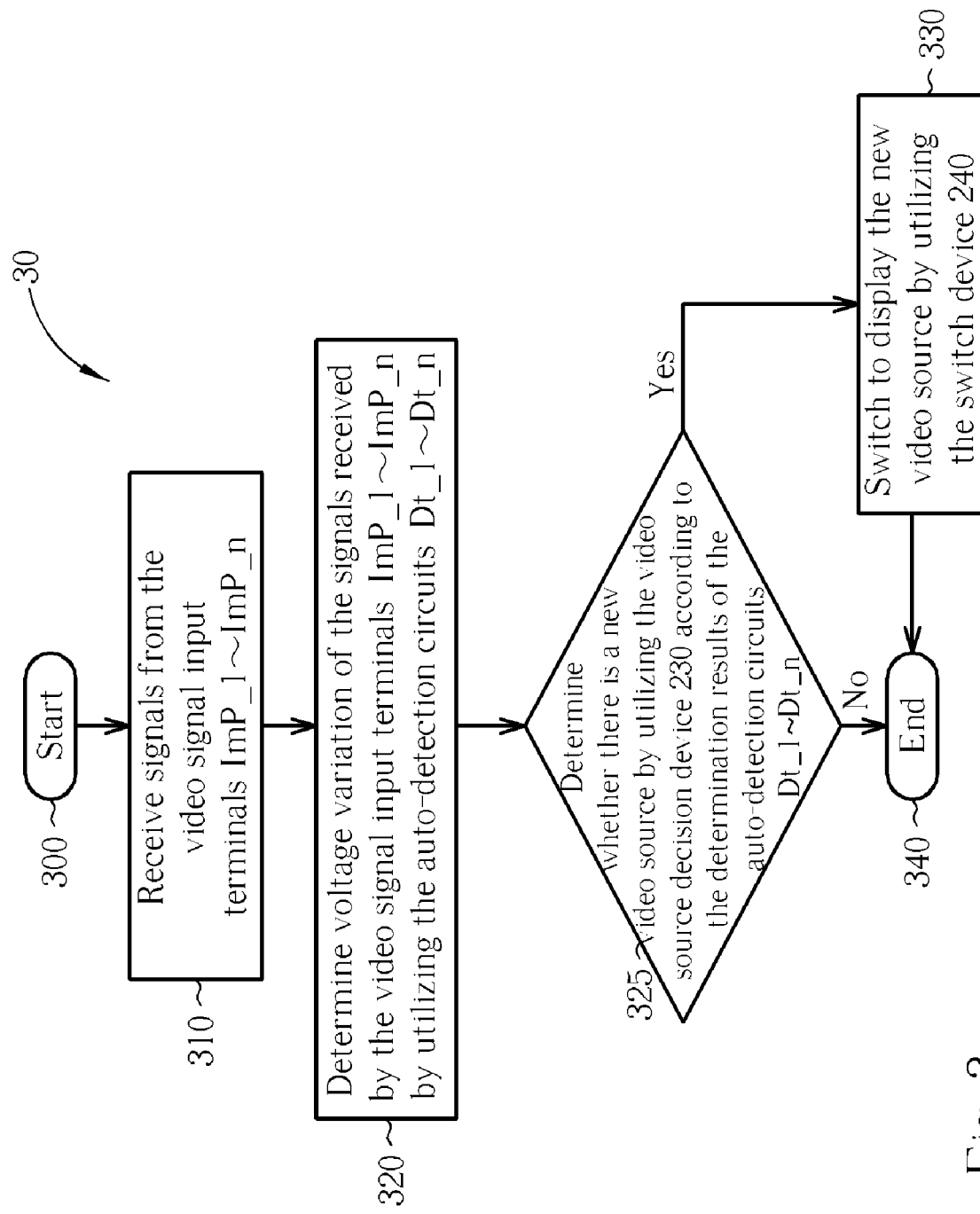
FIG. 3 is a schematic diagram of a process for controlling the display device of FIG. 2 to switch video sources automatically according to the present invention.

Please refer to FIG. 3. FIG. 3 is a schematic diagram of a process 30 for controlling the display device 20 to switch video sources automatically according to the present invention. The process 30 includes the following steps:

Step 300: Start.

Step 310: Receive signals from the video signal input terminals ImP_1~ImP_n.

Step 320: Determine voltage variation of the signals received by the video signal input terminals ImP_1~ImP_n by utilizing the auto-detection circuits Dt_1~Dt_n.

Step 325: Determine whether there is a new video source by utilizing the video source decision device 230 according to the determination results of the auto-detection circuits Dt_1~Dt_n.

Step 330: Switch to display the new video source by utilizing the switch device 240.

Step 340: End.

According to the process 30, the video source decision device 230 determines whether there is a new video source according to the output voltage levels of the auto-detection circuits Dt_1~Dt_n. If there is a new video source, the switch device 240 switches the current video source to the new video source, and displays the new video source in the display device 20. On the contrary, if there is no new video source, the switch device 240 keeps the current video source and displays the current video source in the display device 20. Preferably, the display device 20 performs the process 30 for detecting if there is a new video source once every predetermined time period.

Please note that, in FIG. 2, the determination method of the video source decision device 230 can be progressive scan or interrupted trigger for determining whether there is a new video source inputted from one of the video signal input terminals ImP_1~ImP_n into the display device 20. Furthermore, the video source decision device 230 and the switch device 240 can be implemented in any form, such as by the microprocessors or the FPGAs.

As mentioned above, the present invention provides an auto-detection circuit and a related control method for detecting video signals. Compared with the prior art display device having to be manually switched to the video source, the present invention can auto-detect the video source by detecting the synchronization signal of the video signal. Therefore, when the user switches on a different video output device, the present invention can automatically switch to display the video signal, so as to increase the convenience for the user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An auto-detection circuit for detecting video signals by detecting a synchronization signal of the video signals comprising:
    a reception end for receiving a video signal;
    a synchronization signal detector coupled to the reception end for generating a waveform according to a voltage variation of the video signal, comprising:
        a bipolar transistor comprising a base, a collector, and an emitter coupled to a ground;
        a capacitor coupled between the reception end and the base of the bipolar transistor;
        a first resistor having one end coupled between the capacitor and the base of the bipolar transistor, and another end coupled to a voltage source;
        a second resistor having one end coupled between the capacitor and the base of the bipolar transistor, and another end coupled to the ground; and
        a third resistor having one end coupled to the collector of the bipolar transistor, and another end coupled to the voltage source;
    a peak value detector coupled between the collector of the bipolar transistor and the third resistor for determining a peak value of the waveform;
    a direct current voltage level switch coupled to the peak value detector for switching an output voltage to a first direct current voltage level or a second direct current voltage level; and
    an output end coupled to the direct current voltage level switch for outputting the output voltage.

2. The auto-detection circuit of claim 1, wherein the first resistor and the second resistor bias the bipolar transistor to a normally on condition.

3. The auto-detection circuit of claim 1, wherein the peak value detector comprises:
    a diode coupled between the synchronization signal detector and the direct current voltage level switch;
    a resistor having one end coupled between the diode and the direct current voltage level switch, and another end coupled to a ground;
    a first capacitor having one end coupled between the diode and the direct current voltage level switch, and another end coupled to the ground; and
    a second capacitor having one end coupled between the diode and the direct current voltage level switch, and another end coupled to the ground.

4. The auto-detection circuit of claim 1 further comprising a buffer coupled between the reception end and the synchronization signal detector.

5. The auto-detection circuit of claim 4, wherein the buffer is a common collector amplifier.

6. The auto-detection circuit of claim 5, wherein the buffer comprises:
- a bipolar transistor comprising a base, a collector coupled to a voltage source, and an emitter coupled to the synchronization signal detector;
- a capacitor coupled between the reception end and the base of the bipolar transistor;
- a first resistor having one end coupled between the capacitor and the base of the bipolar transistor, and another end coupled to a voltage source;
- a second resistor having one end coupled between the capacitor and the base of the bipolar transistor, and another end coupled to a ground; and
- a third resistor having one end coupled between the emitter of the bipolar transistor and the synchronization signal detector, and another end coupled to the ground.

7. The auto-detection circuit of claim 1, wherein the synchronization signal is a horizontal synchronization signal.

8. The auto-detection circuit of claim 1, wherein the synchronization signal is a vertical synchronization signal.

9. The auto-detection circuit of claim 1, wherein the synchronization signal is a composite synchronization signal formed by superposing a horizontal synchronization signal and a vertical synchronization signal.

10. A display device capable of auto-detecting video sources comprising:
- a plurality of video signal input terminals for receiving video signals;
- a plurality of auto-detection circuits individually coupled to the plurality of video signal input terminals for detecting the video signals by detecting a synchronization signal of the video signal comprising:
  - a reception end for receiving the video signal;
  - a synchronization signal detector coupled to the reception end for generating a waveform according to a voltage variation of the video signal, comprising:
    - a bipolar transistor comprising a base, a collector, and an emitter coupled to a ground;
    - a capacitor coupled between the reception end and the base of the bipolar transistor;
    - a first resistor having one end coupled between the capacitor and the base of the bipolar transistor, and another end coupled to a voltage source;
    - a second resistor having one end coupled between the capacitor and the base of the bipolar transistor, and another end coupled to the ground; and
    - a third resistor having one end coupled to the collector of the bipolar transistor, and another end coupled to the voltage source;
  - a peak value detector coupled between the collector of the bipolar transistor and the third resistor for determining a peak value of the waveform;
  - a peak value detector coupled to the synchronization signal detector for determining a peak value of the waveform;
  - a direct current voltage level switch coupled to the peak value detector for switching an output voltage to a first direct current voltage level or a second direct current voltage level; and
  - an output end coupled to the direct current voltage level switch for outputting the output voltage; and
- a video source decision device coupled to the plurality of auto-detection circuits for determining a source of the video signals according to detection results of the plurality of auto-detection circuits.

11. The display device of claim 10 further comprising a switch device coupled to the plurality of video signal input terminals and the video source decision device for switching to display signals inputted from a video signal input terminal of the plurality of video signal input terminals according to the decision results of the video source decision device.

12. The display device of claim 10, wherein the first resistor and the second resistor bias the bipolar transistor to operate in a normally on condition.

13. The display device of claim 10, wherein the peak value detector comprises:
- a diode coupled between the synchronization signal detector and the direct current voltage level switch;
- a resistor having one end coupled between the diode and the direct current voltage level switch, and another end coupled to a ground;
- a first capacitor having one end coupled between the diode and the direct current voltage level switch, and another end coupled to the ground; and
- a second capacitor having one end coupled between the diode and the direct current voltage level switch, and another end coupled to the ground.

14. The display device of claim 10, wherein each of the plurality of auto-detection circuits further comprises a buffer coupled between the reception end and the synchronization signal detector.

15. The display device of claim 14, wherein the buffer is a common collector amplifier.

16. The display device of claim 15, wherein the buffer comprises:
- a bipolar transistor comprising a base, a collector coupled to a voltage source, and an emitter coupled to the synchronization signal detector;
- a capacitor coupled between the reception end and the base of the bipolar transistor;
- a first resistor having one end coupled between the capacitor and the base of the bipolar transistor, and another end coupled to a voltage source;
- a second resistor having one end coupled between the capacitor and the base of the bipolar transistor, and another end coupled to a ground; and
- a third resistor having one end coupled between the emitter of the bipolar transistor and the synchronization signal detector, and another end coupled to the ground.

17. The display device of claim 10, wherein the synchronization signal is a horizontal synchronization signal.

18. The display device of claim 10, wherein the synchronization signal is a vertical synchronization signal.

19. The display device of claim 10, wherein the synchronization signal is a composite synchronization signal formed by superposing a horizontal synchronization signal and a vertical synchronization signal.

* * * * *